(12) United States Patent
Carroll (10) Patent No.: US 7,847,512 B2
(45) Date of Patent: Dec. 7, 2010

(54) SOLAR POWERED DC LOAD SYSTEM

(76) Inventor: Min Carroll, P.O. Box 236, Warrenville, IL (US) 60555

( * ) Notice: Subject to any disclaimer, the term of this patent is extended or adjusted under 35 U.S.C. 154(b) by 0 days.

(21) Appl. No.: 12/381,871

(22) Filed: Mar. 17, 2009

(65) Prior Publication Data
US 2009/0236911 A1    Sep. 24, 2009

Related U.S. Application Data

(62) Division of application No. 12/077,697, filed on Mar. 20, 2008.

(51) Int. Cl.
*H01M 10/44* (2006.01)
*H02J 7/00* (2006.01)
*H02J 3/32* (2006.01)
*G05F 1/613* (2006.01)

(52) U.S. Cl. .................. 320/101; 320/134; 320/135; 307/48; 323/231

(58) Field of Classification Search .............. 320/135, 320/134, 101
See application file for complete search history.

(56) References Cited

U.S. PATENT DOCUMENTS

| 4,401,935 | A | | 8/1983 | Yerkes |
| 4,714,868 | A | * | 12/1987 | Maruyama et al. ........... 320/101 |
| 4,742,291 | A | | 5/1988 | Bobier |
| 5,164,653 | A | * | 11/1992 | Reem ........................ 320/135 |
| 5,569,998 | A | | 10/1996 | Cowan |
| 5,751,133 | A | | 5/1998 | Sato |
| 6,590,793 | B1 | | 7/2003 | Nagao |
| 6,693,556 | B1 | | 2/2004 | Jones |
| 2003/0132732 | A1 | * | 7/2003 | Thomas et al. ............ 320/134 |

(Continued)

OTHER PUBLICATIONS

Author: James L. Rogers, title: The complete patent kit, publisher: Sphinx publishing, An Imprint of Sourcebooks, Inc., published: 2005, in Naperville, IL, USA.

*Primary Examiner*—Edward Tso
*Assistant Examiner*—Yalkew Fantu (57) ABSTRACT

The solar powered direct current (DC) load system is a reliable, versatile and user friendly system; it uses solar energy and rechargeable battery powering at least one type of DC load which are: a type of motor operation such as water pump and a type of at least one LED; the system comprises a battery discharge control circuit and a battery output circuit for DC load (FIG. 1), at least one rechargeable battery source (42-F1) which is protected by a preset voltage that limits the lowest discharge level, the circuits in the FIG. 1 are able to combine the circuits in FIG. 2 and FIG. 3 which enable operations of the day time and night time DC load to synchronize the day and night cycles; FIG. 4 is a combination system which incorporates circuits in the FIG. 1 and FIG. 2 to create a water pumping system combined an illumination system which can turn on and off automatically; FIG. 4a with a switch and additional LEDs in addition to the FIG. 4; FIG. 5 is a combination system that incorporates circuits in the FIG. 1 and FIG. 3 to create a water pumping system that works during the day and shuts down at night automatically; FIG. 5a with a switch in addition to the FIG. 5; FIG. 6 is a combination system which incorporates FIG. 1 and FIG. 2 circuits to create an illumination system that has at least one LED which can turn off in the morning and turn on at the evening automatically.

14 Claims, 8 Drawing Sheets

U.S. PATENT DOCUMENTS

2005/0242780 A1* 11/2005 Sakuma et al. .............. 320/134
2005/0258805 A1* 11/2005 Thomas et al. .............. 320/134
2008/0169784 A1 7/2008 Chung
2008/0185988 A1 8/2008 Fan

* cited by examiner

SOLAR POWERED DC LOAD SYSTEM

This divisional application claims priority to Nonprovisional U.S. patent application Ser. No. 12/077,697, filed Mar. 20, 2008, pending, entitled "Decoration solar panel bridge supplying power sources".

BACKGROUND OF THE INVENTION

This invention uses solar energy to power a direct current (DC) load system as well as using rechargeable batteries to store the power that is generated by solar energy to support a DC load. More particularly this invention not only protects the rechargeable battery from over discharge and also targets various needs of the user to create several combination systems including: a water pump combined with an illuminating system, a water pumping system, and an illumination system that includes at least one LED. These combination systems can synchronize the day and night cycles to turn on and off automatically.

The prior art showed some control circuits or apparatus that used solar energy to power a water pump system, or lighting system or battery protection control system. The U.S. Pat. No. 5,569,998, filed Oct. 29, 1996, by Thomas Cowan, indicated that the apparatus controlled a water pumping system with complex control circuits and a high number of components such as voltage reference generator, voltage interpreter, charge current simulator, voltage comparator, and complex charge switch driver ext. This apparatus only can be used for home and the prior art only controls a water pumping system without an illuminating system.

From the US Patent Application Publication number 2008/0185988 A1, filed Feb. 7, 2007, by Chen-Yueh Fan, the control circuit shows that solar garden light device needs an external DC power source which creates additional installation work for the users to support this garden lights. One of embodiments of the present invention has an illumination system which includes at least one LED without the external DC power source. The present invention also shows different circuits and components over the prior art. The present invention can combine the illumination system with the water pumping system.

The current invention has dramatic advantages which are more powerful functionalities and wider range of usage with reliable control circuits that can be put in one apparatus with varied functionality that target different working hours based on daily and seasonal cycles and different need of users.

DETAILED DESCRIPTION OF THE INVENTION

The Figures of drawing are for the purpose of illustration and operation of varied embodiments; the symbolized characters or alternative replacement characters denoting similar elements in the Figures are not limited scope of the invention. Certain changes may be made in the foregoing disclosure without departing from the scope of the invention.

Figure 1:
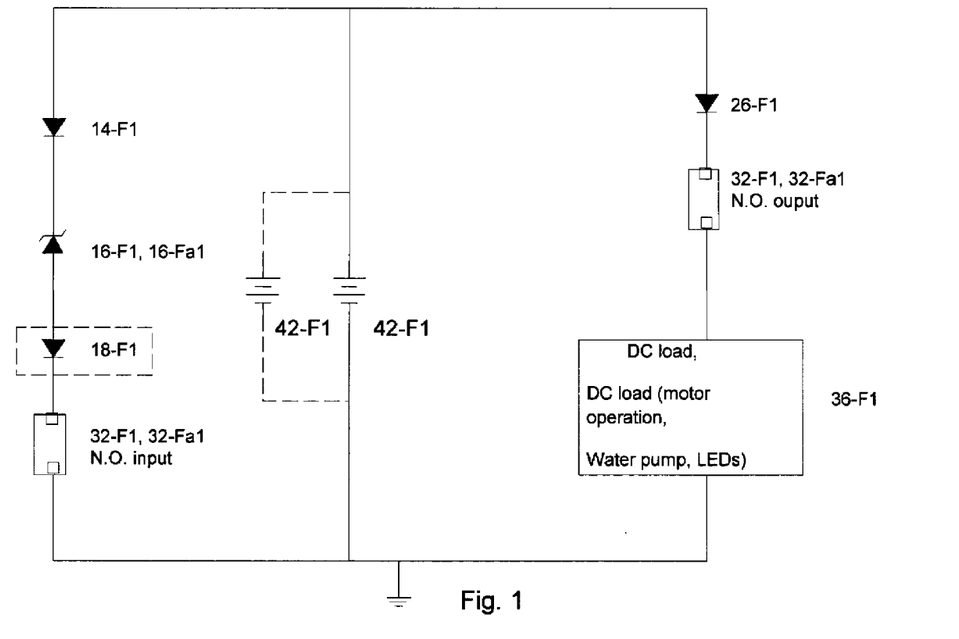
FIG. 1 is a block diagram of (a) a battery discharge control circuit and (b) a battery output circuit for DC load.

According to FIG. 1 of the invention, the present embodiment shows there is a need to protect the rechargeable battery and it is critical to avoid the rechargeable battery from over discharge.

One of the circuits involved in the present embodiment is a battery discharge control circuit. This circuit comprises a preset voltage which is determined by a number of components: at least one diode (14-F1, 18-F1), a zener diode 16-F1 or a replacement of the zener diode 16-Fa1, an input of a normally open (N.O.) solid state relay 32-F1 or a normally open (N.O.) device 32-Fa1. A nominal voltage is nominated by at least one rechargeable battery source 42-F1 for the DC load system. The components within the preset voltage are connected in series to each other then coupled in parallel to the rechargeable battery source 42-F1. The preset voltage is approximately equal to or greater than the nominal voltage of the rechargeable battery source, when an input voltage drops out of the low end control range of the input of the N.O. solid state relay 32-F1 or normally open (N.O.) device 32-Fa1 and reaches the preset voltage level, an output of the N.O. solid state relay 32-F1 or the N.O. device 32-Fa1 opens up and disconnects at least one type of DC load 36-F1 to access the rechargeable battery source 42-F1. The preset voltage is the lowest level that the rechargeable battery source can discharge. The rechargeable battery source includes a rechargeable battery or a rechargeable battery pack.

The second circuit shown in FIG. 1 of the present embodiment is a battery output circuit for DC load. The circuit comprises at least one rechargeable battery source 42-F1 that is the same power storage source in the battery discharge control circuit and is connected in parallel to a diode 26-F1 and the output of the N.O. solid state relay 32-F1 or the N.O. device 32-Fa1 that is the same solid state relay or the N.O. device in the battery discharge control circuit, at least one type of the DC load 36-F1 which includes but not limited to a type of motor operation such as water pump and a type of at least one LED/light emitting diode directly or indirectly connected in series to a negative pole of the output of the N.O. solid state relay 32-F1 or the N.O. device 32-Fa1. Additional rechargeable battery sources 42-F1 can increase the capacity of the power for the system. The circuits in this embodiment are reliable and have an ability to combine with additional circuits and components which make the system more useful.

Figure 2:
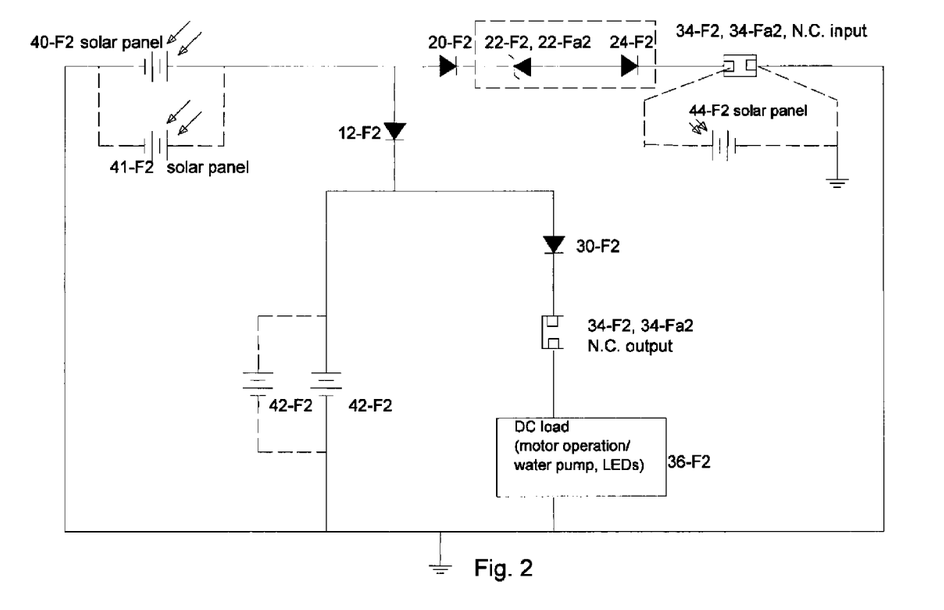
FIG. 2 is a block diagram of (a) a control circuit for night time DC load, (b) an output circuit for night time DC load, and (c) a charging battery circuit.
Figure 3:
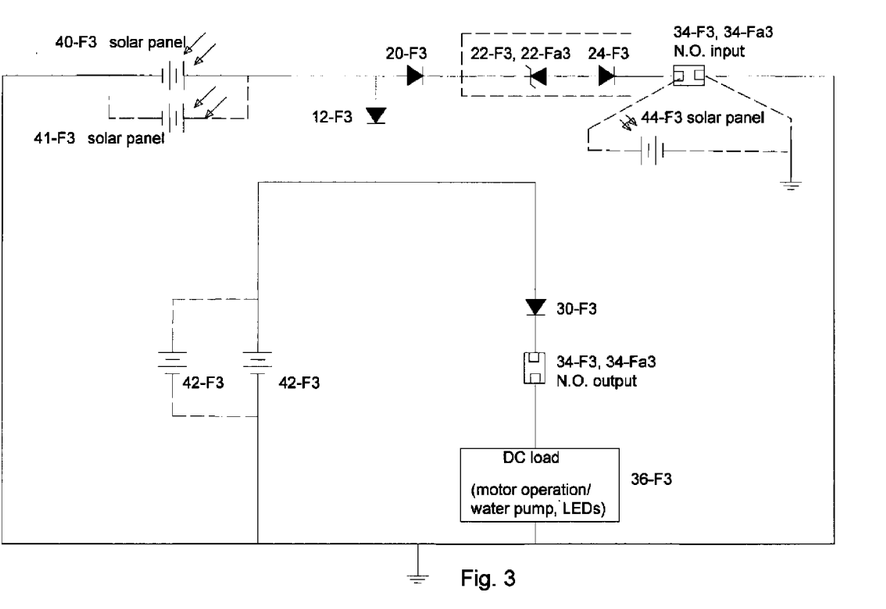
FIG. 3 is a block diagram of (a) a control circuit for day time DC load, (b) a combined an output circuit for day time DC load to a battery charging circuit.

The battery discharge control circuit and the battery output circuit for DC load can combine with additional circuits and components including circuits from the FIG. 2 and FIG. 3 to create a combination system.

Referring to the FIG. 2 of the invention, the first circuit is a control circuit for night time DC load comprises a predetermined voltage that is determined by at least one diode (20-F2, 24-F2) connected in series to an input of a normally closed (N.C.) solid state relay 34-F2 or a normally closed (N.C.) device 34-Fa2, a zener diode 22-F2 or a replacement of the zener diode 22-Fa2 may be connected to the input of the N.C. solid state relay 34-F2 or the N.C. device 34-Fa2 in series for adjusting the predetermined voltage up to the voltage of at least one system solar panel (40-F2, 41-F2), or alternatively using a small solar panel 44-F2 instead of the system solar panel 40-F2 without the diodes. The components within the predetermined voltage (20-F2, 22-F2 or 22-Fa2, 24-F2 and 34-F2 or 34-Fa2 input N.C.) are connected to each other in series then connected in parallel to the system solar panels (40-F2, 41-F2) which is synchronizing the day and night cycles for the night time DC load.

Synchronizing the day and night cycles for the night time DC load means that when at least one system solar panel (40-F2, 41-F2) connected in parallel to the input of the normally closed (N.C.) solid state relay 34-F2 or the normally closed (N.C.) device 34-Fa2 and it may connect to the diodes (20-F2, 22-F2 or 22-Fa2, 24-F2) or using the small solar panel (44-F2) to replace the system solar panel 40-F2 without the diodes, the input of the N.C. solid state relay 34-F2 or the N.C. device 34-Fa2 prevents the system solar panels (40-F2, 41-F2) and the rechargeable battery source 42-F2 to access at least one type of the DC load (water pump and at least one LED) 36-F2 in the early morning through the day, but connected the rechargeable battery source 42-F2 to the DC load at evening through the night, therefore an output of the N.C. solid state relay or the N.C. device 34-F2 opens up (is turned on) in the early morning through the day time, the DC load 36-F2 cannot receive power to operate, but the output of the N.C. solid state relay 34-F2 or the N.C. device 34-Fa2 is closed at evening through the night, the DC load 36-F2 can receive power to operate.

The second circuit for FIG. 2 of the embodiment is an output circuit for night time DC load which comprises at least one rechargeable battery source 42-F2 that can use the same components used in the battery discharge control circuit and the battery output circuit for DC load and is connected in parallel to a diode 30-F2, an output of the N.C. solid state relay 34-F2 or the N.C. device 34-Fa2 that is the same solid state relay or the N.C. device in the control circuit for night time DC load, at least one type of the DC load 36-F2 which can be the same DC load in the battery output circuit and it connected in series to a negative pole of the output of the N.C. solid state relay or the N.C. device 34-F2.

During the day, the night time DC load 36-F2 has no output, but there is a charging battery circuit which includes at least one system solar panel 40-F2 charging at least one rechargeable battery source 42-F2 through an anti-reverse power diode 12-F2 for DC load that is used at night. The embodiment can have more than one system solar panel (40-F2, 41-F2) to increase the output power. The output voltage of the system solar panel 41-F2 can be the same value with the system solar panel 40-F2, but the output of current can be the same or different.

The control circuit for night time DC load, the output circuit for night time DC load and the charging battery circuit in FIG. 2 can combine with additional circuits and components including circuits from the FIG. 1 and FIG. 3 to create a combination system which makes the system more powerful, widens the usage to satisfy users need.

According to FIG. 3 of the invention, this embodiment involves several circuits. The first one is a control circuit for day time DC load 36-F3 which comprises a predetermined voltage that is determined by at least one diode (20-F3 24-F3) connected in series to an input of a normally open (N.O.) solid state relay 34-F3 or a normally open (N.O.) device 34-Fa3, a zener diode 22-F3 or replacement of the zener diode 22-Fa3 may be connected to the input of the N.O. solid state relay 34-F3 or the N.O. device 34-Fa3 in series for adjusting the predetermined voltage up to a voltage of at least one system solar panel (40-F3, 41-F3) or alternatively uses a small solar panel 44-F3 instead of the system solar panel 40-F3 without the diodes; the components (20-F3, 24-F3, 22-F3 or 22-Fa3, 34-F3 or 34-Fa3 N.O. input) within the predetermined voltage are connected in series to each other then connected in parallel to the system solar panel 40-F3 which is synchronizing the day and night cycles for day time DC load.

Synchronizing the day and night cycles for day time DC load means that when at least one system solar panel (40-F3, 41-F3) connected in parallel to the input of the N.O. solid state relay 34-F3 or the normally open (N.O.) device 34-Fa3 and may connect to the diodes (20-F3, 22-F3 or 22-Fa3, 24-F3), or using the small solar panel 44-F3 to replace the system solar panel 40-F3 without the diodes, the input of the N.O. solid state relay 34-F3 or the N.O. device 34-Fa3 prevents the rechargeable battery source 42-F3 to access at least one type of the DC load 36-F3 at evening through the night but is connected to the system solar panel 40-F3 and the rechargeable battery source 42-F3 to the DC load 36-F3 in the early morning through the day, therefore an output of the N.O. solid state relay 34-F3 or the N.O. device 34-Fa3 is closed (turned on) in the early morning through the day time, the DC load 36-F3 can receive power to operate; the output of the N.O. solid state relay 34-F3 or the N.O. device 34-Fa3 is opened at evening through the night, the DC load 36-F3 cannot receive power to operate.

The second circuit for FIG. 3 of the embodiment is a combined an output circuit for day time DC load to a battery charging circuit which comprises at least one rechargeable battery source 42-F3 that can be the same component used in the battery discharge control circuit and it connected in parallel to a diode 30-F3 and an output of the N.O. solid state relay 34-F3 or the N.O. device 34-Fa3 that is the same N.O. solid state relay or the N.O. device in the control circuit for day time DC load, at least one type of the DC load (water pump and at least one LED) 36-F3 connected to a negative pole of the output of the N.O. solid state relay 34-F3 or the N.O. device 34-Fa3, at least one system solar panel (40-F3, 41-F3) connected in parallel to two diodes (12-F3, 30-F3) and the output of the N.O. solid state relay 34-F3 or the N.O. device 34-Fa3 and the DC load 36-F3; during the day, the system solar panel (40-F3, 41-F3) charges at least one rechargeable battery source 42-F3 through an anti-reverse power diode 12-F3 while powering the DC load 36-F3 through the diodes (12-3, 30-F3) and the output of the N.O. solid state relay 34-F3 or the N.O. device 34-Fa3. The DC load 36-F3 may receive a partial or full or non power from the system solar panel 40-F3 or rechargeable battery source 42-F3 which depends upon the system solar panel output power and rechargeable battery source capacity and sun light conditions. The output voltage of the system solar panel 41-F3 can be the same value with the system solar panel 40-F3, but the output of current can be the same or different.

The control circuit for day time DC load and the combined the output circuit for day time DC load to the battery charging circuit in FIG. 3 can incorporate with additional circuits and components including circuits from FIG. 1 and FIG. 2 which makes the system more powerful and widens the usage to satisfy users need.

Figure 4:
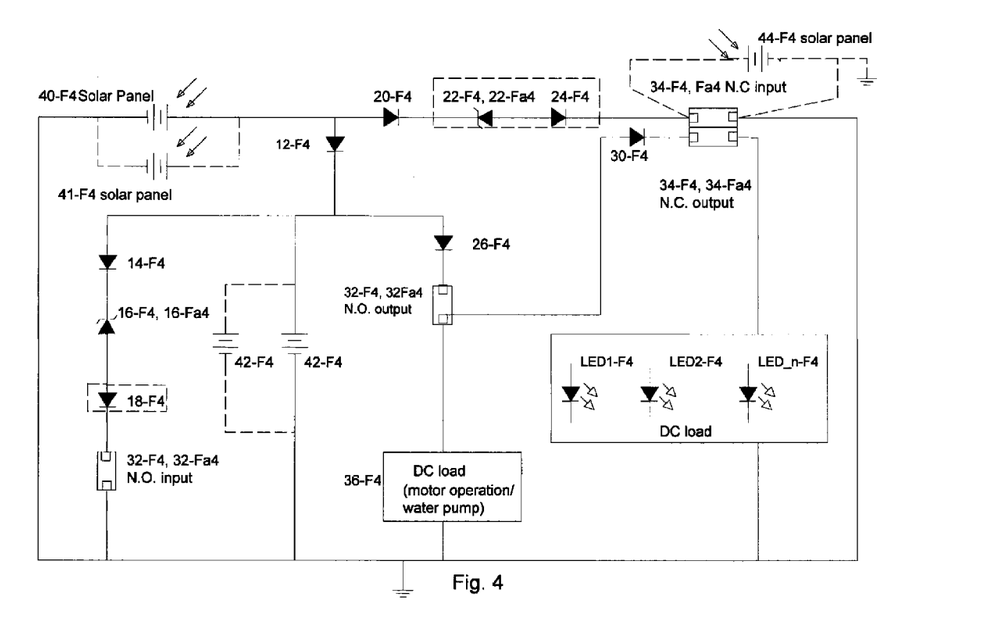
FIG. 4 is a combination block diagram of (a) a battery discharge control circuit, (b) a control circuit for night time DC load, (c) a combined battery output circuit for DC load to a charging battery circuit, (d) a combined a battery output circuit for DC load to an output circuit for night time DC load.
Figure 4A:
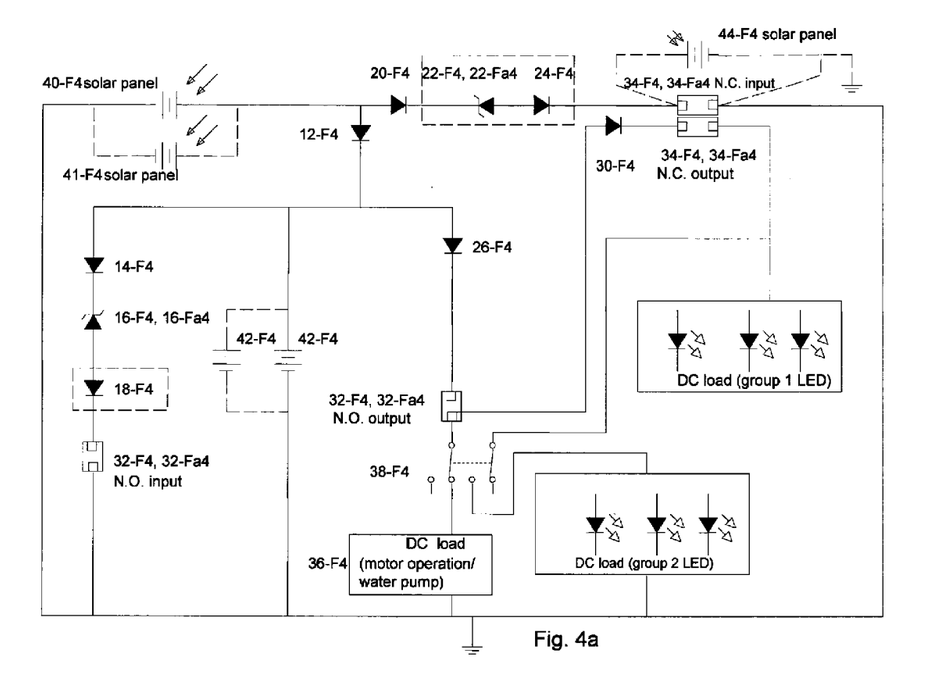
FIG. 4a with a switch and group 2 LED in addition to the FIG. 4.

Referring to FIG. 4 and FIG. 4a of the invention, the system selected the FIG. 1 and FIG. 2 to create a combination embodiment. The current embodiment shows a water pumping system combined with an illumination system which is more powerful and widens the usage to satisfy user needs.

The first circuit in FIG. 4 and FIG. 4a is a battery discharge control circuit comprises a preset voltage and this voltage is determined by a number of components: at least one diode (14-F4, 18-F4), a zener diode 16-F4 or a replacement of the zener diode 16-Fa4, an input of a normally open (N.O.) solid state relay 32-F4 or a normally open (N.O.) device 32-Fa4 including positive and negative poles. A nominal voltage is nominated by at least one rechargeable battery source 42-F4. The components within the preset voltage (14-F4, 16-F4 or 16-Fa4, 18-F4) are connected to each other in series then coupled to the rechargeable battery source 42-F4 in parallel. The preset voltage is approximately equal to or greater than the nominal voltage of the rechargeable battery source 42-F4, when an input voltage drops out of the low end control range of the input of the N.O. solid state relay 32-F4 or the N.O. device 32-Fa4 and reaches the preset voltage level, an output of the N.O. solid state relay 32-F4 or the N.O. device 32-Fa4 opens up and disconnects a DC load 36-F4 to access the rechargeable battery source 42-F4. The preset voltage is the lowest level that the rechargeable battery source 42-F4 can discharge; the rechargeable battery source 42-F4 includes a rechargeable battery or a rechargeable battery pack.

The second circuit in FIG. 4 and FIG. 4a is a control circuit for night time DC load comprises a predetermined voltage that is determined by at least one diode (20-F4, 24-F4) connected in series to an input of a normally closed (N.C.) solid state relay 34-F4 or a normally closed (N.C.) device 34-Fa4, a zener diode 22-F4 or an replacement of the zener diode 22-Fa4 may be connected to the input of the N.C. solid state relay 34-F4 or the N.C. device 34-Fa4 in series for adjusting the predetermined voltage up to a voltage of at least one system solar panel (40-F4, 41-F4); or using a small solar panel 44-F4 instead of the system solar panel 40-F4 without the diodes; the components within the predetermined voltage (20-F4, 22-F4 or 22-Fa4, 24-F4 and 34-F4 or 34-Fa4 N.C. input) are connected to each other in series then connected in parallel to the system solar panels (40-F4, 41-F4) which is synchronizing the day and night cycles for night time DC load.

Synchronizing the day and night cycles for night time DC load means that when at least one system solar panel (40-F4, 41-F4) connected in parallel to the input of the N.C. solid state relay 34-F4 or the N.C. device 34-Fa4 and may connect to the diodes (20-F4, 22-F4 or 22-Fa4, 24-F4) or using the small solar panel to replace the system solar panel 44-F4 without the diodes, the input of the N.C. solid state relay 34-F4 or the N.C. device 34-Fa4 prevents the system solar panel 40-F4 and the rechargeable battery source 42-F4 to access at least one LED (LED1-F4, LED2-F4, LEDn-F4) for the embodiment of the FIG. 4, and a group 1 LED and a group 2 LED for the embodiment of the FIG. 4a in the early morning through the day, but connected the rechargeable battery source 42-F4 to the DC load (LED 1-F4, LED2-F4, LEDn-F4), the group 1 LED and the group 2 LED at evening through the night, the output of the N.C. solid state relay 34-F4 or the N.C. device 34-Fa4 is opened in the early morning through the day time, the DC load (LED1-F4, LED2-F4, LEDn-F4), the group 1 LED and the group 2 LED cannot receive power; an output of the N.C. solid state relay 34-F4 or the N.C. device 34-Fa4 is closed at evening through the night time, the DC load (LED1-F4, LED2-F4, LEDn-F4), the group 1 LED and the group 2 LED can receive power to illuminate.

The third circuit is a combined the battery output circuit for DC load to a charging battery circuit comprises at least one rechargeable battery source 42-F4 that is the same storage source in the battery discharge control circuit and is connected in parallel to a diode 26-F4 and an output of the Normally. Open (N.O.) solid state relay 32-F4 or the normally open (N.O.) device 32-Fa4 that is the same solid state relay or the device in the battery discharge control circuit, the DC load water pump 36-F4 directly or indirectly connected in series to a negative pole of the output of the N.O. solid state relay 32-F4 or the N.O. device 32-Fa4 through a double pole double throw 38-F4 for FIG. 4a or without a double pole double throw 38-F4 for FIG. 4.; during the day, at least one system solar panel (40-F4, 41-F4) charges at least one rechargeable battery source 42-F4 through a diode 12-F4 which is for anti-reverse power purpose while powers the water pump 36-F4 through the diode 26-F4 and the output of the N.O. solid state relay 32-F4 or the N.O. device 32-Fa4 if sun light is intense enough. The water pump 36-F4 may receive a partial or full or non power from the system solar panel 40-F4 or rechargeable battery source 42-F4 which depends upon the system solar panels (40-F4, 41-F4) output power and rechargeable battery source 42-F4 capacity and sun light conditions.

The fourth circuit is a combined the battery output circuit for DC load to an output circuit for night time DC load comprises at least one rechargeable battery source 42-F4 which is the same component in the battery discharge control circuit and is connected in parallel to the diode 26-F4, the output of the N.O. solid state relay 32-F4 or the N.O. device 32-Fa4 that is the same N.O solid state relay or the N.O device in the battery discharge control circuit, an output of the N.C. solid state relay 34-F4 or the N.C. device 34-Fa4 that is the same solid state relay or the N.C. device in the control circuit for night time DC load and is connected in series to a negative pole of the output of the N.O. solid state relay 32-F4 or the device 32-Fa4 through a diode 30-F4, the DC load at least one LED (LED1-F4, LED2-F4, LEDn-F4) connected to a negative pole of the output of the solid state relay 34-F4 or the N.C. device 34-Fa4 for the FIG. 4; a group 1 LED and a group 2 LED connected to the negative pole of the output of the N.C. solid state relay 34-F4 or the N.C. device 34-Fa4 for FIG. 4a.

The embodiment in the FIG. 4 is for a warm climate area, the water is not frozen all year, so the water pump 36-F4 does not have to shut down. But in some areas during the winter or when the water is frozen the water pump 36-F4a cannot pump the water, the embodiment in the FIG. 4a allows the DC load 36-F4 to shut down when needed. A double pole double throw (DPDT) switch 38-F4 or an equivalent component performs similar functions like the DPDT switch may employ to perform those features. The DPDT switch 38-F4 can disconnect the DC load water pump 36-F4 to access the rechargeable battery source 42-F4 and the system solar panel 40-F4 through the diodes (12-F4, 26-F4) and the output of the N.O. solid state relay 32-F4 or the N.O. device 32-Fa4 while it can simultaneously connect the group 2 LED which includes at least one LED to the rechargeable battery source through the diode 26-F4, the output of the N.O. solid state relay 32-F4 or the N.O. device 32-Fa4, the diode 30-F4 and the output of the N.C. solid state relay 34-F4 or the N.C. device 34-Fa4, or non-connected to either the water pump 36-F4 nor the DC load group 2 LED; the group 2 LED is for balancing the power usage when the rechargeable battery source 42-F4 does not powering the DC load water pump 36-F4.

Figure 5:
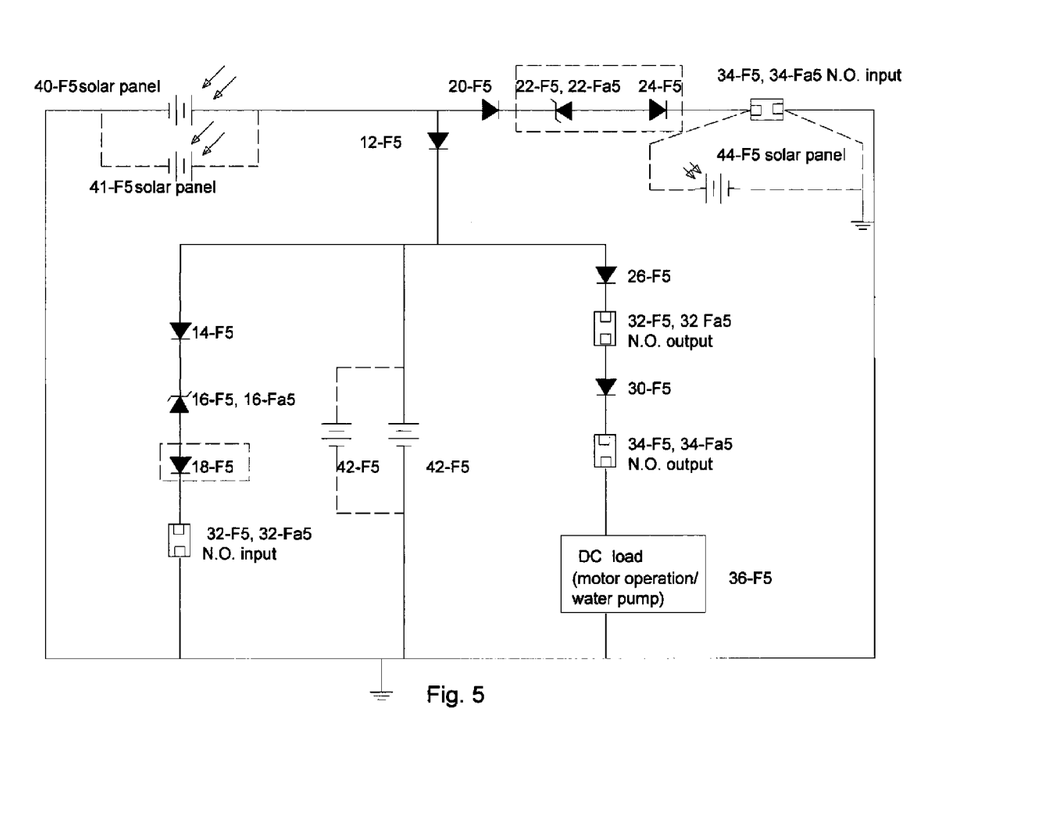
FIG. 5 is a combination block diagram of (a) a battery discharge control circuit, (b) a control circuit for day time DC load, (c) a combined a battery output circuit for DC load to an output circuit for day time DC load and a charging battery circuit.
Figure 5A:
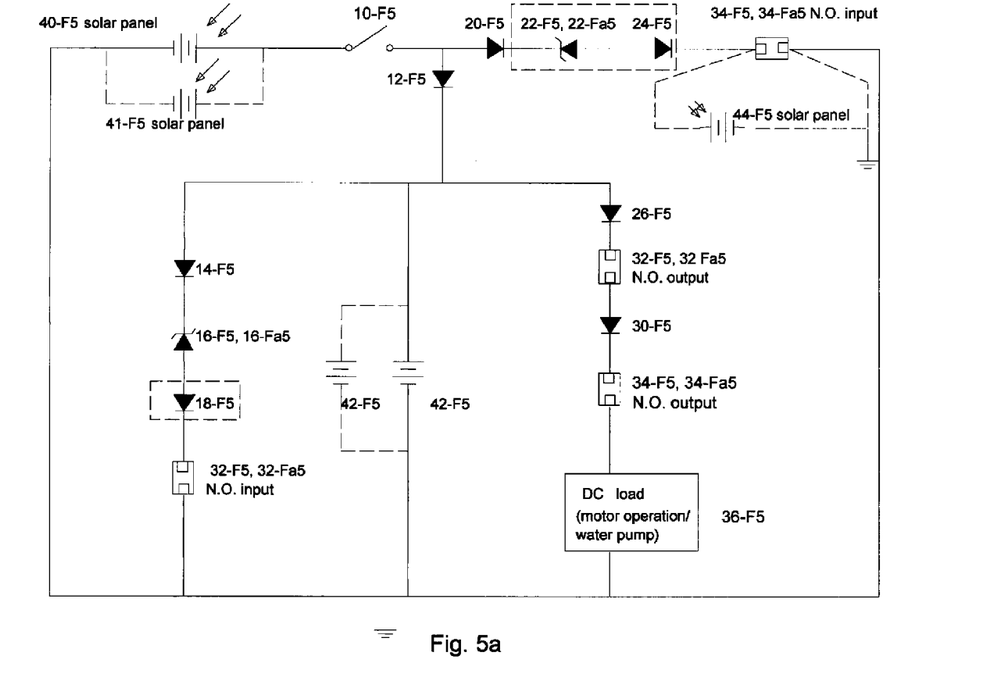
FIG. 5a with a switch in addition to FIG. 5.

The FIG. 5 and FIG. 5a of the invention show selections from FIG. 1 and FIG. 3 to create a combination of the DC load water pumping system which works during the day and shuts off at night automatically, the combination system is an another example for widening the usage and satisfying different users need.

The first circuit in FIG. 5 and FIG. 5*a* is a battery discharge control circuit comprises a preset voltage which is determined by: at least one diode (14-F5, 18-F5), a zener diode 16-F5 or a replacement of the zener diode 16-Fa5, an input of a normally open (N.O.) solid state relay 32-F5 or a normally open (N.O.) device 32-Fa5. A nominal voltage is nominated by at least one rechargeable battery source 42-F5. The components within the preset voltage are connected to each other in series then coupled to the rechargeable battery source 42-F5 in parallel. The preset voltage is approximately equal to or greater than the nominal voltage of the rechargeable battery source 42-F5. When the input voltage drops out of the low end control range of the input of the N.O. solid state relay 32-F5 or the N.O. device 32-Fa5 and reaches the preset voltage level, an output of the N.O. solid state relay 32-F5 or the N.O. device 32-Fa5 opens up and disconnects a DC load 36-F5 to access the rechargeable battery source 42-F5. The preset voltage is the lowest level that the rechargeable battery source 42-F5 can discharge. The rechargeable battery source 42-F5 includes a rechargeable battery or a rechargeable battery pack.

The second circuit in FIG. 5 and FIG. 5*a* is a control circuit for day time DC load comprises a predetermined voltage that is determined by at least one diode (20-F5, 24-F5) connected in series to an input of a normally open (N.O.) solid state relay 34-F5 or a normally open (N.O.) device 34-Fa5, a zener diode 22-F5 or a replacement of the zener diode 22-Fa5 may be connected to the input of the N.O. solid state relay 34-F5 or the N.O. device 34-Fa5 in series for adjusting the predetermined voltage up to the voltage of at least one system solar panel (40-F3, 41-F5); or alternatively using a small solar panel 44-F5 instead of the system solar panel 40-F5 without the diodes. The components within the predetermined voltage (20-F5, 22-F5 or 22-Fa5, 24-F5 and 34-F5 or 34-Fa5 N.O. input) are connected in series to each other then connected in parallel to the system solar panels (40-F5, 41-F5) which is synchronizing the day and night cycles for day time DC load.

Synchronizing the day and night cycles for day time DC load means that when at least one system solar panel (40-F5, 41-F5) connected in parallel to the input of the normally open (N.O.) solid state relay 34-F5 or the N.O. device 34-Fa5 and may connect to the diodes (20-F5, 22-F5 or 22-Fa5 and 24-F5), or using the small solar panel 44-F5 to replace the system solar panel (40-F5, 41-F5) without the diodes, the input of the N.O. solid state relay 34-F5 or the N.O. device 34-Fa5 prevents the system solar panel and the rechargeable battery source 42-F5 to access the DC load water pump 36-F5 at the evening and through the night but connected the system solar panel 40-F5 and rechargeable battery source 42-F5 to the water pump 36-F5 in the early morning through the day, therefore an output of the N.O. solid state relay 34-F5 or the N.O. device 34-Fa5 is closed (turned on) in the early morning through the day time, the water pump 36-F5 can receive power to operate, the output of the N.O. solid state relay 34-F5 or the N.O. device 34-Fa5 is opened at evening through the night, the water pump 36-F5 cannot receive power to operate;

The third circuit in FIG. 5 and FIG. 5*a* is a combined a battery output circuit to an output circuit for day time DC load and the charging battery circuit comprises at least one rechargeable battery source 42-F5 that is the same power storage source in the battery discharge control circuit and it connected in parallel to a diode 26-F5 and an output of the Normally Open (N.O.) solid state relay 32-F5 or the N.O. device 32-Fa5 that is the same N.O. solid state relay or the N.O. device in the battery discharge control circuit, the output of the N.O. solid state relay 34-F5 or the N.O. device 34-Fa5 that is the same N.O. solid state relay or the N.O. device in the control circuit for day time DC load and is connected in series to a negative pole of the output of the N.O. solid state relay 32-F5 or the N.O. device 32-Fa5 through a diode 30-F5, a DC load of water pump connected in series to a negative pole of the output of the N.O. solid state relay 34-F5 or the N.O. device 34-Fa5 which is the same solid state relay or the device used in the control circuit for day time DC load; during the day if sun light is intensity enough, at least one system solar panel (40-F5, 41-F5) charges at least one rechargeable battery source 42-F5 through a switch 10-F5 and a diode 12-F5 for FIG. 5*a* or through the diode 12-F5 for FIG. 5 while powers the water pump 36-F5 through a diode 26-F5, the output of the N.O. solid state relay 32-F5 or the N.O. device 32-Fa5, the diode 30-F5 and the output of the N.O. solid state relay 34-F5 or the N.O. device 34-Fa5. The water pump 36-F5 may receive a partial or full or non power from the system solar panel 40-F5 or rechargeable battery source 42-F5 which depends upon the system solar panel output power and the rechargeable battery source 42-F5 capacity and sun light conditions; the single pole single throw switch 10-F5 may employ to control the system solar panels (40-F5, 41-F5) to access all the circuits including all of the components when the weather not allowed the water pump 36-F5 to pump the water; the diode 12-F5 is for anti-reverse power purpose.

Figure 6:
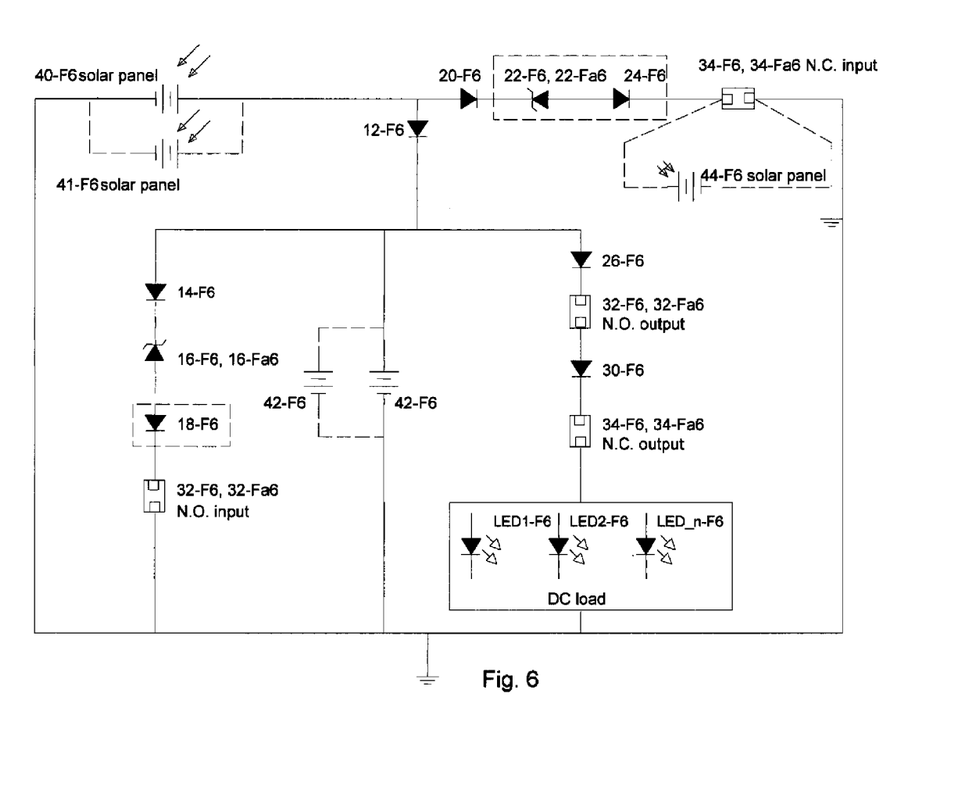
FIG. 6 is a combination block diagram of (a) a battery discharge control circuit, (b) a control circuit for night time DC load, (c) a combined a battery output circuit for DC load to an output circuit for night time DC load, and (d) a charging battery circuit.

The FIG. 6 of the invention selected FIG. 1 and FIG. 2 to create a combination embodiment for an illumination system, it turned off in the morning through the day and turns on at evening through the night automatically; this is an another example of widening the usage and satisfying different users needs.

The first circuit in FIG. 6 is a battery discharge control circuit comprises a preset voltage which is determined by a number of components: at least one diode (14-F6, 18-F6), a zener diode 16-F6 or a replacement of the zener diode 16-Fa6, an input of a normally open (N.O.) solid state relay 32-F6 or a normally open (N.O.) device 32-Fa6. A nominal voltage is nominated by at least one rechargeable battery source 42-F6. The components within the predetermined voltage are connected to each other in series (14-F6, 16-F6 or 16-Fa6, 18-F6, 32-F6 or 32-Fa6 N.O. input) then coupled to at least one rechargeable battery source 42-F6 in parallel. The preset voltage is approximately equal to or greater than the nominal voltage of the rechargeable battery source, when the input voltage drops out of the low end control range of the input of the N.O. solid state relay 32-F6 or the N.O. device 32-Fa6 and reaches the preset voltage level, an output of the N.O. solid state relay 32-F6 or the N.O. device 32-Fa6 opens up and disconnects a DC load that includes at least one LED (LED1-F6, LED2-F6, LED n-F6) to access the rechargeable battery source 42-F6. The preset voltage is the lowest level that the rechargeable battery source 42-F6 can discharge. The rechargeable battery source 42-F6 includes a rechargeable battery or a rechargeable battery pack.

The second circuit in FIG. 6 is a control circuit for night time DC load includes a predetermined voltage that is determined by at least one diode (20-F6, 24-F6) connected in series to an input of normally closed (N.C.) solid state relay 34-F6 or a normally closed (N.C.) device 34-Fa6, a zener diode 22-F6 or a replacement of the zener diode 22-Fa6 may be connected to the input of the N.C. solid state relay 34-F6 or the N.C. device 34-Fa6 in series for adjusting the predetermined voltage up to the voltage of at least one system solar panel 40-F6, or alternatively using a small solar panel 44-F6 instead of the system solar panel 40-F6 without the diodes; the components within the predetermined voltage (20-F6, 22-F6 or 22-Fa6, 24-F6 and 34-F6 or 34-Fa6 N.C. input) are connected in series to each other then connected in parallel to the system solar panel (40-F6) which is synchronizing the day and night cycles for the night time DC load.

Synchronizing the day and night cycles for night time DC load means when at least one system solar panel (40-F6, 41-F6) connected in parallel to the input of the normally closed (N.C.) solid state relay 34-F6 or the normally closed (N.C.) device 34-Fa6 and may connected to the diodes (20-F6, 22-F6 or 22-Fa6, 24-F6), or using a small solar panel 44-F6 to replace the system solar panel 40-F6 without the diodes, the input of the N.C. solid state relay 34-F6 or the N.C. device 34-Fa6 prevents the system solar panel 40-F6 and the rechargeable battery source 42-F6 to access the at least one LED (LED1-F6, LED2-F6, LED_n-F6) in the early morning through the day but connected the rechargeable battery source 42-F6 to access the at least one LED (LED1-F6, LED2-F6, LED_n-F6) at evening through the night, therefore an output of the N.C. solid state relay 34-F6 or the N.C. device 34-Fa6 turned on in the early morning through the day time, the DC load (LED1-F6, LED2-F6, LED_n-F6) cannot receive power, the output of the N.C. solid state relay 34-F6 or the N.C. device 34-Fa6 is closed at evening through the night time, the DC load (LED1-F6, LED2-F6, LED_n-F6) can receive power for illumination.

The third circuit in FIG. 6 is a combined a battery output circuit to an output circuit for night time DC load comprises at least one rechargeable battery source 42-F6 which is the same battery source in the battery discharge control circuit and is connected in parallel to a diode 26-F6 and an output of the N.O. solid state relay 32-F6 or the normally open (N.O.) device 32-Fa6 that is the same N.O. solid state relay or the N.O. device in the battery discharge control circuit, the output of the N.C. solid state relay 34-F6 or the N.O. device 34-Fa6 that is the same solid state relay or the device in the control circuit for night time DC load and is connected in series to a negative pole of the output of the N.O. solid state relay 32-F6 or the device 32-Fa6 through a diode 30-F6, a DC load includes at least one LED (LED1-F6, LED2-F6, LED_n-F6) connected directly or indirectly to a negative pole of the output of the N.C. solid state relay 34-F6 or the N.C. device 34-Fa6.

During the day, there is a charging battery circuit, at least one system solar panel (40-F6, 41-F6) charges at least one rechargeable battery source 42-F6 through a diode 12-F6 which is used for anti-reversed power.

The combination system selected circuits and components from FIG. 1 and FIG. 2 to create an illumination system, it turned off in the morning through the day and turns on at evening through the evening automatically, which is another example of widening the usage to satisfy different user needs.

The normally open (N.O.) device (32-Fa1, or 34-Fa3, or 32-Fa4, or 32-Fa5, or 34-Fa5, or 32-Fa6) is a device that can replace the normally open (N.O.) solid state relay (32-F1, or 34-F3, or 32-F4, or 32-F5, or 34-F5, or 32-F6) respectively which has an input including positive and negative poles (control terminals) and an output including positive and negative poles (first and second terminals), the input current and voltage control the output current and voltage, the normally open (N.O.) device further including a normally open I/O module, or a normally open relay, or a normally open optocoupler (opto-isolator) or the device that performs the similar functions as the normally open device.

The normally closed (N.C.) device (34-Fa2 or 34-Fa4 or 34-Fa6) is a device can replace the normally closed (N.C.) solid state relay (34-F2 or 34-F4 or 34-F6) respectively, which has an input including positive and negative poles (control terminals) and an output including positive and negative poles (first and second terminals), the input current and voltage control the output current and voltage, the N.C. device further including a normally closed I/O module, or a normally closed relay, or an optocoupler (opto-isolator) or the N.C. device that performs the similar functions as the normally closed device.

The replacement of the zener diode 16-Fa1 or 22-Fa2 or 22-Fa3 or 22-Fa4 or 16-Fa4 or 16-Fa5 or 22-fa5 or 16-Fa6 or 22-Fa6 can replace the zener diode 16-F1 or 22-F2 or 22-F3 or 22-F4 or 16-F4 or 16-F5 or 22-F5 or 16-F6 or 22-F6 respectively, the replacement of the zener diode further including a light emitting diode, or a resistor, or a component that consumes approximately the same voltage and current as the zener diode.

The small solar panel 44-F2, or 44-F3, or 44-F4 or 44-F5 or 44-F6 is a small output power solar panel that is only used for controlling the input of the normally closed (N.C.) solid state relay 34-F2, or 34-F4 or 34-F6 or the normally closed (N.C.) device 34-Fa2, or 34-Fa4 or 34-Fa6 and the input of the normally open (N.O.) solid state relay 34-F3, or 34-F5 or the normally open (N.O.) device 34-Fa3, or 34-Fa5, it has approximately the same effect compared to using the system solar panel 40-F2, 41-F2 or 40-F3, 41-F3 or 40-F4, 41-F4 or 40-F5, 41-F5 or 40-F6, 41-F6 respectively for synchronizing the day and night cycles.

I claim:

1. Rechargeable battery protection circuits, comprising:
   (a) a battery discharge control circuit comprising a preset voltage that is determined by components of at least one diode, a zener diode, and an input of a normally open solid state relay a nominal voltage that is nominated by at least one rechargeable battery source;
   wherein said components within said preset voltage are connected to each other in series then coupled to the at least one rechargeable battery source in parallel;
   wherein said preset voltage is substantially equal to or greater than said nominal voltage of said rechargeable battery source,
   wherein said zener diode is able to be replaced by a substitutive component;
   wherein said preset voltage means when the input voltage drops out of the low end control range of the input of the normally open solid state relay and reaches the preset voltage level, an output of the normally open solid state relay opens up and disconnects at least one type of DC (direct current) load to access the rechargeable battery source, the preset voltage is the lowest level that the rechargeable battery source is discharged;
   wherein said rechargeable battery source includes at least one rechargeable battery or at least one rechargeable battery pack; and
   (b) a battery output circuit for DC load comprising at least one rechargeable battery source of said battery discharge control circuit, and is connected in parallel to a diode, the output of said normally open solid state relay of said battery discharge control circuit, and at least one type of the DC load which includes a type of motor operation having water pump and a type of at least one LED directly or indirectly connected in series to the negative pole/terminal of said output of said normally open solid state relay;
   wherein said input of said normally open solid state relay is able to be replaced by an input of a functionally interchangeable device, where each of said solid state relay or said functionally interchangeable device has the input of positive and negative control poles/terminals, and the output of positive and negative poles/terminals, said output of said normally open solid state relay is able to be replaced by said output of said functionally interchangeable device; and wherein said battery discharge control circuit or said battery output circuit for DC load is able to combine with additional circuit(s) or component(s) respectively.

2. The rechargeable battery protection circuits of claim 1, wherein said substitutive component further comprising a light emitting diode.

3. The rechargeable battery protection circuits of claim 1, wherein said functionally interchangeable device for said normally open solid state relay further comprising an I/O, input/output, module.

4. The rechargeable battery protection circuits of claim 1, wherein said functionally interchangeable device for said normally open solid state relay further comprises a normally open relay.

5. The rechargeable battery protection circuits of claim 1, wherein said functionally interchangeable device for said normally open solid state relay further comprises an opto-coupler.

6. The rechargeable battery protection circuits of claim 1, wherein said functionally interchangeable device for said normally open solid state relay further comprises an opto-isolator.

7. The rechargeable battery protection circuits of claim 1, wherein said substitute component for said zener diode further comprises a resistor.

8. Rechargeable battery protection circuits, comprising:
(a) a battery discharge control circuit comprising a voltage across elements of an input of a normally open solid state relay and a zener diode, said voltage across elements connected to each other in series then coupled to a rechargeable battery source in parallel,
  wherein said voltage across elements determined a preset voltage that is substantially equal to or greater than nominal voltage of said rechargeable battery source,
  wherein said preset voltage means that when an input voltage drops out of the low end control range of the input of the normally open solid state relay and reaches the preset voltage level, an output of the normally open solid state relay disconnects at least one direct current load to access the rechargeable battery source, the preset voltage is at the lowest level that the rechargeable battery source is discharged;
  wherein said input of said normally open solid state relay is able to be replaced by an input of a functionally interchangeable device, where each of said solid state relay or said functionally interchangeable device has input of positive and negative control poles/terminals, and output of positive and negative poles/terminals, said output of said normally open solid state relay is able to be replaced by said output of said functionally interchangeable device;
  wherein said zener diode is able to be replaced by a substitutive element;
(b) a battery output circuit for DC load comprising a rechargeable battery source of said battery discharge control circuit, and is connected in parallel directly or indirectly to the positive pole/terminal of said output of said normally open solid state relay of said battery discharge control circuit, the negative pole/terminal of said output of said normally open solid state relay is connected in series directly or indirectly to said at least one direct current load,
  wherein said rechargeable battery source includes at least one rechargeable battery or at least one rechargeable battery pack; and
  wherein said battery discharge control circuit or said battery output circuit for the DC load is able to combine with additional circuit(s) or element(s) respectively.

9. The rechargeable battery protection circuits of claim 8 wherein said functionally interchangeable device for said solid state relay further comprises an I/O, input/output, module.

10. The rechargeable battery protection circuits of claim 8, wherein said functionally interchangeable device for said solid state relay further comprises a normally open relay.

11. The rechargeable battery protection circuits of claim 8, wherein said functionally interchangeable device for said solid state relay further comprises an opto-coupler.

12. The rechargeable battery protection circuits of claim 8, wherein said functionally interchangeable device for said solid state relay further comprises an opto-isolator.

13. The rechargeable battery protection circuits of claim 8, wherein said substitutive element for said zener diode further comprises a light emitting diode.

14. The rechargeable battery protection circuits of claim 8, wherein said substitutive element for said zener diode further comprises a resistor.

* * * * *